United States Patent [19]

Spinney

[11] Patent Number: 5,414,704
[45] Date of Patent: May 9, 1995

[54] ADDRESS LOOKUP IN PACKET DATA COMMUNICATIONS LINK, USING HASHING AND CONTENT-ADDRESSABLE MEMORY

[75] Inventor: Barry A. Spinney, Wayland, Mass.

[73] Assignee: Digital Equipment Corporation, Maynard, Mass.

[21] Appl. No.: 223,379

[22] Filed: Apr. 5, 1994

Related U.S. Application Data

[63] Continuation of Ser. No. 964,738, Oct. 22, 1992, abandoned.

[51] Int. Cl.⁶ .................. H04J 3/26; H04L 12/46; H04L 12/56
[52] U.S. Cl. .................. 370/60; 370/94.1; 395/400; 395/600
[58] Field of Search .......... 370/60, 85.13, 85.14, 370/94.1; 340/825.52; 395/400, 600

[56] References Cited

U.S. PATENT DOCUMENTS

| | | | |
|---|---|---|---|
| 4,587,610 | 5/1986 | Rodman | 395/400 |
| 4,677,550 | 6/1987 | Ferguson | 364/300 |
| 4,680,700 | 7/1987 | Hester et al. | 364/200 |
| 4,695,949 | 9/1987 | Thatte et al. | 364/200 |
| 4,780,816 | 10/1988 | Connell | 364/200 |
| 4,922,417 | 5/1990 | Churm et al. | 364/200 |
| 4,933,937 | 6/1990 | Konishi | 370/85.13 |
| 5,027,350 | 6/1991 | Marshall | 370/94.1 X |
| 5,032,987 | 7/1991 | Broder et al. | 364/200 |
| 5,109,336 | 4/1992 | Guenther et al. | 395/425 |
| 5,121,495 | 6/1992 | Nemes | 395/600 |
| 5,136,580 | 8/1992 | Videlock et al. | 370/94.1 X |
| 5,197,002 | 3/1993 | Spencer | 395/400 X |
| 5,247,620 | 9/1993 | Fukuzawa et al. | 395/325 |

FOREIGN PATENT DOCUMENTS

| | | | |
|---|---|---|---|
| 0522743 | 1/1993 | European Pat. Off. | H04L 29/06 |
| 4023527 | 1/1991 | Germany | H04L 12/46 |

*Primary Examiner*—Melvin Marcelo
*Attorney, Agent, or Firm*—A. Sidney Johnston; David A. Dagg

[57] ABSTRACT

A way of doing source address and destination address lookups is described, as may be used in a packet data communication system. A way of searching a relatively large database is described, using a combination of programmable hash algorithms, binary search algorithms, and a small content-addressable memory (CAM). The technique is efficient in space, time and cost, compared to prior methods. For example, prior methods using conventional binary reads may have used thirteen reads, whereas this technique requires on average two reads, with a worst case of four reads.

22 Claims, 8 Drawing Sheets

ADDRESS LOOKUP IN PACKET DATA COMMUNICATIONS LINK, USING HASHING AND CONTENT-ADDRESSABLE MEMORY

This application is a continuation, of application Ser. No. 07/964,738, filed Oct. 22, 1992, now abandoned.

RELATED CASES

The application discloses subject matter also disclosed in the following copending U.S. patent applications, all of which are assigned to Digital Equipment Corporation:

Ser. No. 07/964,791, filed Oct. 22, 1992, by Nigel Terence Poole, for "BACKPLANE WIRING FOR HUB IN PACKET DATA COMMUNICATIONS SYSTEM" (PD92-0558);

Ser. No. 07/964,792, filed Oct. 22, 1992, by Nigel Terence Poole, for "CROSSBAR SWITCH FOR SYNTHESISING MULTIPLE BACKPLANE INTERCONNECT TOPOLOGIES IN COMMUNICATIONS SYSTEM" (PD92-0559);

Ser. No. 07/965,651, filed Oct. 22, 1992, by Bryan Alan Spinney, for "PACKET FORMAT IN HUB FOR PACKET DATA COMMUNICATIONS SYSTEM" (PD93-0012); and Ser. No. 07/969,121, filed Oct. 22, 1992, by Martin Edward Griesmer et al, for "APPARATUS AND METHOD FOR MAINTAINING FORWARDING INFORMATION IN A BRIDGE OR ROUTER" (PD93-0013).

BACKGROUND OF THE INVENTION

This invention relates to address translation as used in packet data communications, and more particularly to a way of doing source and destination address lookups in such a system, using a combination of hashing, binary search, and CAM lookup.

In a packet data communication network of the Ethernet, token ring, or FDDI type, for example, there is usually the need to translate addresses. Some protocols or systems specify a 48-bit source and destination address so that a globally unique address is provided. However, for efficient use of resources at a local segment of a large network, it is advantageous to use smaller address fields instead of 48-bit addresses, for efficiency in bit-count of messages as well as efficiency in processing and storage. For this reason, while the 48-bit addresses are carried in the packet throughout its lifetime, shorter addresses are generated for local routing and processing. Thus, a translation mechanism must be provided to allow switching between global and local addresses. Examples of prior address translation methods used in packet dam communications networks are disclosed in U.S. Pat. Nos. 4,933,937, 5,027,350, and 5,136,580.

A typical translation method employs a database of addresses in one format, with indexing into the database using the addresses of the other format. Hashing is often used in a method of this type to shorten size of the addresses needed, and to provide more heavily populated data structures (reduce memory requirements). A binary search engine is also commonly used for such address lookups. Content addressable memories are a third technique for solving the search requirement.

An address database of, for example, 16K addresses (requiring a 14-bit address to enter) would require a worst case of fourteen reads in a straightforward binary search. This is prohibitive from a performance standpoint, because the device receiving the packet with the address must process packets at a very high rate to keep current with the traffic on a typical network. The memory accesses and processing time in devices made using commonly available semiconductor technology are not compatible with this method.

CAM technology, on the other hand, requires only one read operation to compare all stored addresses with an incoming address. However, the complexity and cost are prohibitive. Perhaps 100-times more transistor devices are required, compared to standard static RAM devices. An example of an address translation method using a CAM in a virtual addressing mechanism for computer memory is disclosed in U.S. Pat. No. 4,587,610.

Hashing algorithms have provided the most efficient solutions to the address lookup problem. The hashing solutions previously developed, however, exhibit inefficiencies in memory usage, low speed, and large worst-case delays, compared to the method provided herein.

There were several goals and constraints imposed in the development of this invention. Generally, it was desirable to reduce the space needed on printed circuit board to implement the system, and it was to be of minimum cost and electrical power consumption. To this end, adding chips to the already-required chips population, or adding pins to these chips, was undesirable. That is, a goal is to provide address translation in a system without any additional overhead compared to a system without translation.

Generally, there was a need for a capability of about 16K address entries as a maximum, where ten to one hundred bridge handles were available. There was no need for more than this because of the limited addressing requirements of Ethernet. The address lookup should not require more than about 2.4 microsec per packet so that the smallest messages could be handled continuously in real time. The lookup should be completed before the next packet arrives so the inefficient use of packet memory will be avoided for packets that will be discarded, and no "yet-to-be-looked-up" queue need be maintained. Another burden is that address sets are not randomly assigned, so if a hash function is chosen randomly, the hash function will not be functional for some sets of addresses (hash will result in too many collisions) and a new hash function is required. Generally, it is desirable that there is a less than 1-in-100 chance of a new hash function being required for any given set of 16K addresses, meaning that probably fewer than 1-in-1000 customers will ever have to rehash. A general requirement is that the memory needed for the translation function (e.g., hash tables, etc. ) should not impose hardware burdens on the system, and the format of the memory (data path width, etc.) should match that needed for packet memory usage.

SUMMARY OF THE INVENTION

In accordance with one embodiment of the invention, a way of doing source address and destination address lookups is provided, as may be used in a packet data communication system. A way of searching a relatively large database uses a combination of programmable hash algorithms, binary search algorithms, and a small content-addressable memory (CAM). The technique is efficient in space, time and cost, compared to prior methods. For example, prior methods using conventional binary reads may have used thirteen reads, whereas this technique requires on average two reads, with a worst case of four reads.

A feature is the use of two different techniques to perform the address lookup. The vast majority of lookups are obtained by hashing the address, using a programmable 48-bit to 48-bit linear hash function, and then using the low-order 16-bits, to obtain one of 64K hash buckets, where each hash bucket contains both a pointer to a set of zero to seven lookup records, and the number of lookup records in this set. A set of lookup records is organized as a perfectly balanced, breadth-first binary tree. To obtain the required address, a binary search of this tree is done, and since the maximum depth of any tree is three, tile maximum number of reads required is four—one to read the pointer from the hash bucket and the tree size, and three reads (maximum) to traverse a tree. A breadth-first storage representation is chosen because storage allocation for a breadth-first tree is never greater than the number of elements in the tree. For example, a hash bucket which points to five entries will take exactly five lookup records—with no lookup records required to be empty.

The second technique used in tile combination is to handle the reasonably-rare case when more than seven 48-bit addresses hash to the same bucket. To handle this case, one of the addresses is simply put in a CAM memory chip that is present anyway. Also, it is noted that a destination address is compared to the CAM contents anyway, for other purposes, so no new hardware or operation is needed. The result of the comparison is either (a) tile entry is not found in the CAM, or (b) a number (0-to-255) supplying the index of tile associated lookup record in a translation table. About thirty-two or so of these entries can be handled in a CAM with not significant burden, in one embodiment, with plenty of room left in the CAM for protocol filtering entries.

There is a third technique used in the combination, according to one embodiment. Rather than storing the full 48-bit address (along with the new shorter address) in the lookup record, to enable tile binary search comparison matching (i.e., greater than, less than, or equal to) to be done, as was true in prior methods, a smaller value is stored. To avoid requiring two reads (in an embodiment using 56-bit data paths to memory), advantage is taken of fact that all of the possible ($2^{47}-1$) programmable hash functions are mathematically one-to-one functions, and hence the comparison can just as easily be done with the full 48-bit hashed address as with the original incoming packet address. Since all of the hash entries associated with a particular hash bucket must have the same lower 16-bit hash value, it is only necessary to store the additional 32-bit part (48-bit hashed address minus the bottom 16-bit field) in the lookup record.

Another interesting feature in one embodiment is the use of a powerful set of programmable hash functions. Any hash function can be used of the form:

$$(M^*addr)MOD(X^{48}+X^{36}+X^{25}+X^{10}+1)$$

where M is any non-zero 48-bit polynomial, and where the arithmetic is performed in "field of polynomials of degree 48 over the Galois field of order 2+ (same mathematical structures as are used for network CRC, cyclic redundancy checks). Traditional techniques often used a fixed hash function, which can cause problems for certain address sets. With this invention, however, a new value of M is picked and a re-hash is done to replace the tables, whenever too many hash bucket collisions occur. Also, some conventional hash techniques used functions that weren't as "randomizing" and thus created too many collisions, or used functions which weren't both efficient and fast in both hardware and software.

The technique of the invention is intended to be used whenever a large database (e.g., from less than 1K to greater than 64K entries) is to be searched. In the particular use described herein, the technique is employed to perform a hardware search of an address database, which could have up to 32K entries, for a matching "network" address, at a very high speed. In one embodiment, the technique is able to look up a 48-bit destination address and a 48-bit source address for each packet, at a rate of over 400,000 packets per second, as may be needed in an FDDI system. The worst case single address lookup requires at most four memory reads, and typically averages about two memory reads. This high address lookup rate is required to implement bridging on high speed network links operating by the IEEE 802.1D standard, in order to perform source and destination address lookups on minimum-sized packets; the systems which may use this method include FDDI (100Mbits/sec), T3/E3 (45/34Mbits/sec) and Sonet (155Mbits/sec).

Accordingly, a technique is provided that is taster than binary searches, more deterministic than conventional software hash functions (i.e., worst case performance isn't much worse than typical performance), and cheaper than strictly CAM approaches. Thus, a less expensive approach is provided to perform very high speed lookups )e.g., more than 100,000 address searches per second on data bases with greater than 8,000 addresses. This solution is needed in bridges and routers on high speed links in packet data communications networks.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

FIG. 6 is a diagram of a data structure used for a hash table in the system of FIGS. 1 and 1a;

FIG. 8 is a flow chart of address lookup procedures used in the embodiment of the invention of FIGS. 1 and 1a.

DETAILED DESCRIPTION OF SPECIFIC EMBODIMENT

Figure 1:
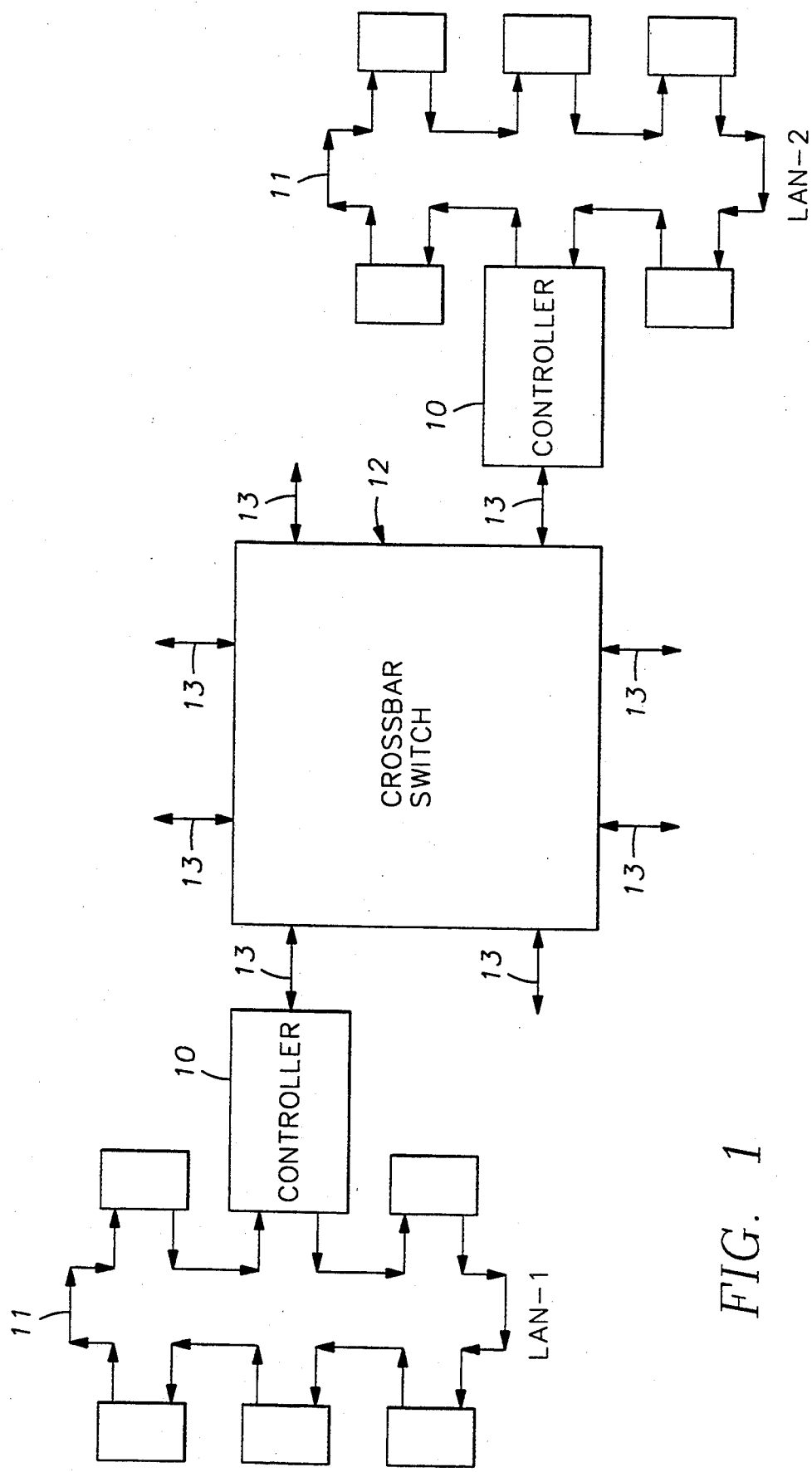
FIG. 1 is a diagram in block form of a communications network which may use features according to one embodiment of the invention.

Referring to FIG. 1, a packet data communications network which may use the features of the invention includes a controller 10 for interface between an FDDI link 11 and a crossbar switch device 12. The crossbar switch device 12 has a number of input/output ports 13, and each one of these ports 13 may be connected by another controller 10 to another network segment 11 such as an FDDI link or a token ring or Ethernet bus, for example. The crossbar switch 10 ordinarily makes a direct point-to-point interconnect between one port 13 and another port 13, so that the crossbar acts as a bridge or router in the network, linking one network segment to another. A station on a link 11 sends a packet onto its network segment with a destination address which is on another, different segment. The controller 10 for this segment detects the address as being that of a station on one of the remote segments, and generates local switching information to send to the crossbar 12 so that the appropriate interconnect can be made to send the packet to the proper port 13 and link 11, via another controller 10. As set forth in the above-mentioned co-pending applications, the crossbar switch device can function as a flexible interconnect device to create a ring or bus using the ports 13, as well as functioning as a point-to-point connector as is the usual case for crossbar switches.

Figure 1A:
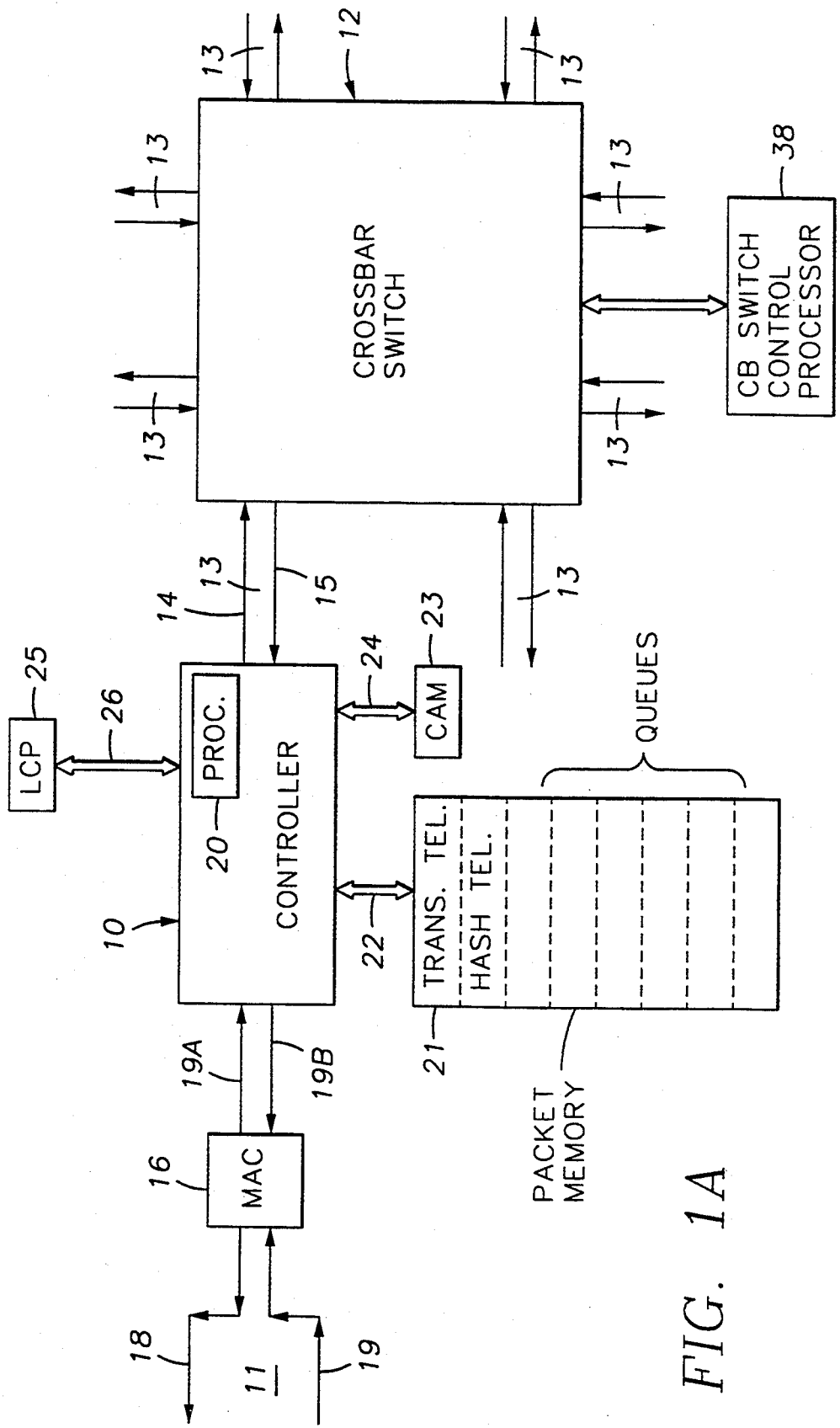
FIG. 1a is an electrical diagram in block form of a controller for the communications network of FIG. 1.

Referring to a more detailed view of FIG. 1a, each port 13 of the crossbar has a data-in path 14 and a separate data-out path 15. The interface between the controller 10 and the FDDI link 11 is by way of a media access control (MAC) device 16, functioning to convert the serial light transmission on the incoming fiber optic cable 17 to electrical pulses, to recover the clock, convert the serial dam on the optic loop to 6-bit parallel symbols, act as an elastic buffer to allow reclocking of data entering the controller 10, etc. Of course, all of these functions are reversed for outgoing data on the cable 18. The interface between the controller 10 and the MAC device 16 is by an incoming 8-bit parallel data path 19a (with additional parity and control lines) and an outgoing 8-bit parallel path 19b.

The controller 10 contains a processor or state machine 20 to execute various processes as will be described, and accesses a packet memory 21 via an interface 22, as well as a content addressable memory (CAM) 23 via interface 24. The packet memory 21 is addressed by a 20-bit address bus, and data is transferred by a 56-bit bidirectional data bus, included in the interface 22; various control lines are also in the interface 22. The CAM 23 is driven by a 14-bit bus and various control lines in the interface 24. The packet memory 21 is a RAM which stores a number of queues for incoming and outgoing data packets, as well as translation tables and hash tables as will be described. In addition, the packet memory stores certain data for which addresses are matched in the CAM 23.

The controller 10 also interfaces with a line card processor 25 by bus 26. The line card processor 25 is used to execute some diagnostic and initialization functions, and does not operate in routine packet transfer.

Logically, the processor 20 in the controller 10 executes six independent processes. There are two for inbound packet processing, two for outbound packet processing, one for interfacing to the external packet memory, and one for line card processor access. Packets inbound on FDDI line 17 and going through the controller 10 to the crossbar switch 12 are referred to as "inbound." Likewise, packets going in the direction of crossbar switch 12 through the controller 10 to the FDDI output line 18 are referred to as "outbound." By having independent processes which can operate in parallel, the controller 10 can process inbound and outbound packets at full speed. Distributed among the processes are control, parameter and status registers that are used to define the operational modes and to determine the internal state of the controller 10; these registers are accessed through the node processor interface 26.

Figure 2:
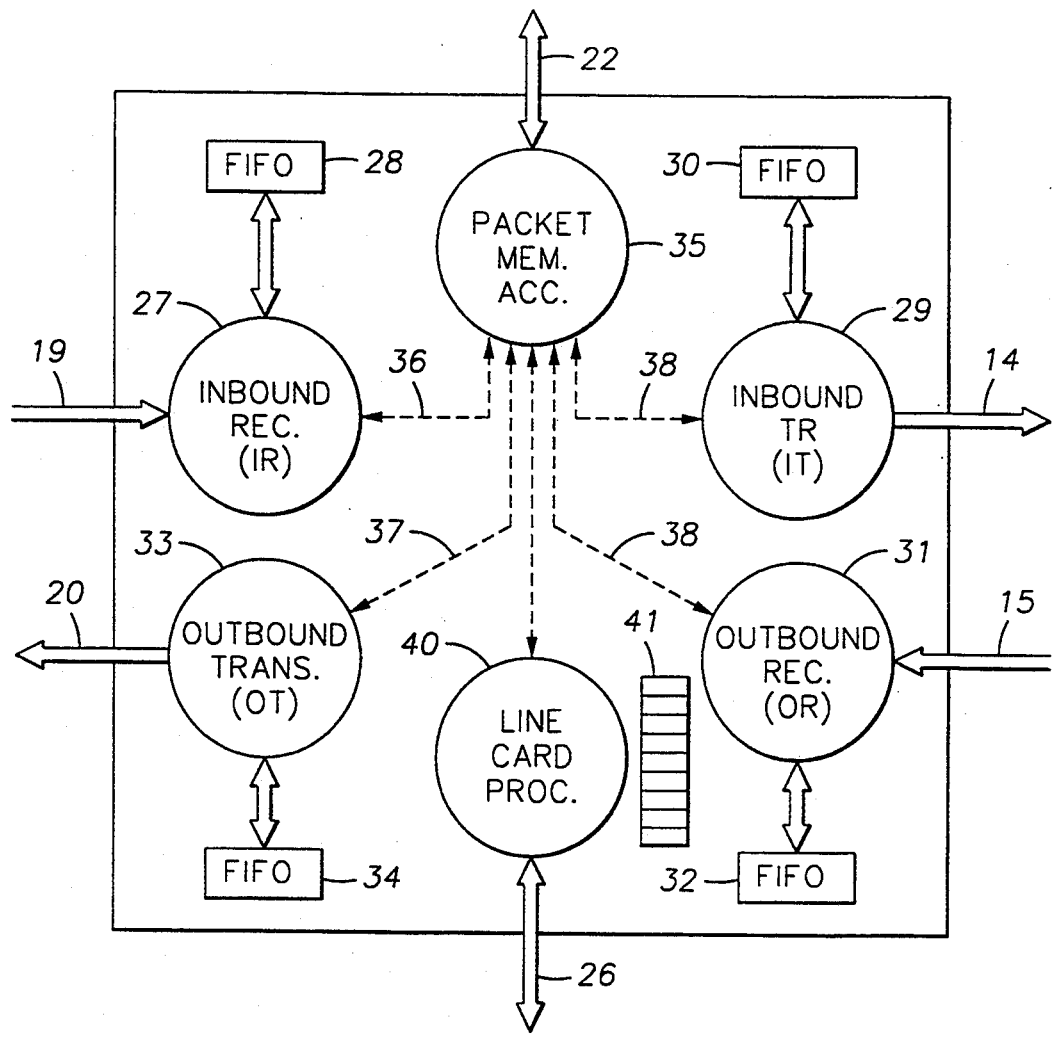
FIG. 2 is a diagram of the controller of FIG. 1 and 1a showing processes executed in the controller.

Referring to FIG. 2, the inbound receive (IR) process 27 executed on the processor 20 receives packets from the interface 19a to the FDDI ring via the media access control device 16. The IR process 27 parses and decodes each incoming packet from line 19a, places the packet data into an intermediate FIFO 28, and performs the necessary processing to determine if the packet is to be forwarded to the crossbar 12. For bridged packets, this decision is made by performing destination address, source address, and protocol field lookups, with the aid of the content addressable memory 23 and the internal hash function, according to the invention. The result of the lookup will determine where the packet is to go. The packet may have to be transmitted to another port 13 on the crossbar 12 to reach its destination, the packet may be destined for the line card processor 25, the packet may be destined for a processing engine 38 in the crossbar switch 12, or the packet may be filtered and discarded. When the IR process 27 decides a packet is to be forwarded to the crossbar 12, it uses the lookup results to generate the information in an added header as will be described. It will select an inbound queue to store the packet in the external packet memory 21 and will initiate memory requests to transfer the data from its intermediate FIFO 28 to the selected queue in the external packet memory 21. The processor 20 executing this IR process 27 performs this operation by generating IR requests that are sent to the packet memory 21.

The IR process 27 also handles a number of exception conditions. The forwarding of packets to processing engines in the switch 12 can be rate limited by software to prevent the traffic from a single port from overwhelming the shared processing resources of the switch 12. When these rate limits are exceeded the IR process 27 will discard these packets until the rate limit is replenished.

The inbound transmit (IT) process 29, again referring to FIG. 2, services the queues in packet memory 21 that contain packets to be transmitted to the crossbar switch 12. These packets are stored in queues in the external packet memory 21 of the controller 10. When an enabled queue has a packet count greater than one, the IT process 29 will begin processing of the packet by initiating packet memory requests to move data from the packet memory 21 to an internal FIFO 30. Part of the data transferred is the added header associated with the packet. The IT process 29 uses this added header field to request a connection on the crossbar 12 to the desired destination port 13; it requests this connection by sending information to the port interface 13 that indicates the destination port of the switch 12 and service class information describing how the connection is to be serviced. Prior to requesting the connection, the IT process 29 checks the timestamp stored with the packet and will discard the packet if it has expired. If the IT process 29 determines that a packet has expired after a connection has been requested but before the connection is made, it will discard the packet, abort the requested connection and continue servicing the enabled queues.

When a connection is established, the IT process 29 transfers the data from its intermediate FIFO 30 to the crossbar 12 via path 14 and performs the proper packet formatting during transmission.

The outbound receive (OR) process 31 executing on the processor 20 receives packets from the crossbar switch 12 interface 15, parses and decodes each packet, places the packet data into an intermediate FIFO 32 and performs the necessary validity checks of the packet's added header to determine if the packet should be received and placed at the tail of an enabled queue in packet memory 21. Packet reception is established when the controller 38 for the crossbar indicates that this controller 10 is the desired destination port for a connection. The OR process 31 indicates its willingness to take part in a connection by asserting a "next" control signal in the interface 15 that the crossbar controller 38 samples. When this "next" signal is asserted, the crossbar controller may return a signal indicating that a connection between a source port and this destination port has been made on the crossbar 12. The OR process 31 immediately monitors the outbound data received at the crossbar interface 15 to delimit a packet. It will also deassert the "next" signal and will not reassert it until it has determined that it is appropriate to establish a new connection.

The OR process 31 uses the service class field and one specific protocol class field value from the added header of the outbound packet to place the packet on a queue in external packet memory 21. The OR process 31 also handles multiple exception conditions on the crossbar including parity errors in the symbols, and packets with bad delimiters.

The outbound transmit (OF) process 33 services the queues in packet memory 21 that contain packets to be transmitted to the FDDI line 18 via path 19b and device 16. These packets are stored in the external packet memory 21 of the controller 10. When an enabled queue has a packet count greater than one, the TO process 33 will begin processing the packet by initiating packet memory requests to move the data from the external memory 21 to an internal fifo 34. The OT process 33 will discard the packet if the time stamp stored with the packet has expired, otherwise it will request the MAC device 16 to begin a transmission to the FDDI line 18. If the OT process 33 is operating in a bridge link mode, it will decapsulate the packet by removing the added header that was stored with the packet, prior to transmission on the path 19b to the FDDI link. If the OT process 33 is attached to a switch link, it will keep and update the appropriate fields of the added header during transmission to the path 19b and FDDI link.

The packet memory (PM) access process 35 controls the interface 22 to the external packet memory 21. The packet memory 21 is used to hold the packet data of the multiple inbound and outbound queues and is also used to store the PC table, the hash table as described herein, and the translation database used for lookups. The PM process 35 controls access to the external packet memory 21 by arbitrating among all the processes requesting access to it. The PM process 35 will indicate to the requesting process when a cycle has been granted. The external packet memory is accessed via a 56-bit data bus in interface 22. The PM process 35 can select up to 1-million 56-bit words over its 20-bit external packet memory address bus in interface 22. Read or write cycles can be performed every 80-ns to provide 600-Mbps of packet memory bandwidth.

When a process 27, 29, 31, or 33 requests a memory cycle via paths 36, 37, 38, or 39, respectively, it also indicates to the PM process 35 the desired queue that the cycle is associated with by driving the queue number. When the PM process 35 grants the cycle to the requesting process, it uses the queue number provided to simultaneously enable the pointers to the queue to the external memory 21. The PM process 35 will drive the corresponding tail (write cycle) or head (read cycle) pointer onto the external address pins of interface 22 and will perform the necessary pointer maintenance when the cycle completes. The maintenance includes wrapping the head or tail pointer when the boundary of a queue is reached. The PM process 35 will also monitor the queue pointers to detect and signal when a queue is approaching an overflow condition.

Each queue in the external packet memory 21 must be defined before the PM process 35 can perform an access to it. To define a queue, the boundaries for the queue must be specified by programming the external memory block addresses that point to the beginning and end of each queue. A queue is programmable in size in increments of 256 56-bit word units (1792 bytes) which constitute a block. In addition to defining the size of the queue, the owners of the queue head and tail must be specified, to control the direction of packet flow. A separate queue enable is provided for each queue in order to turn each one on and off independently.

The line card processor (LCP) access process 40 provides the interface between the processor 25 and the command and status registers 41 within the controller 10. Some of these registers are accessed directly by the processor 25 and some are accessed indirectly using the LCP process 40. The registers 41 that are indirectly accessible are shared among the processes 27, 29, 31, 33, and 35 of the controller 10 and must be arbitrated for. The indirect access interface of the LCP process 40 provides the mechanisms to select the desired indirect register and to trigger the desired read or write operation. Since the processor 25 does not have direct access to the external packet memory 21 of the controller 10, it must also use the indirect access interface of the LCP process 40 to perform read and write cycles to the external memory 21.

In addition to direct and indirect register 41 access, the LCP process 40 also maintains the traffic event counters and interrupt event registers. The LCP process 40 monitors the traffic events signaled by the processes 27, 29, 31, 33, and 35 to update the corresponding counter. In addition to specified counters, the LCP process 40 provides two general purpose counters that can be programmed to count a particular traffic event. The LCP monitors events in the controller 10 and will set corresponding interrupts. These interrupts are categorized to be associated with inbound traffic, outbound traffic, or fatal interrupts. All interrupts, except fatal interrupts, are maskable. The presence of a non-masked interrupt will result in the assertion of an interrupt signal.

The operation of the processor 20 in controller 10 using the processes referred to includes a number of functions related to inbound and outbound packets.

These include filtering, address lookup, address matching, rate limiting, parity checking, etc.

The controller 10 performs input port filtering to prevent undesired traffic from entering the net, and this filtering is based on certain addresses contained in a packet. A 48-bit destination address and a 48-bit source address in the packet can be filtered for a number of addresses, up to the size of the translation table in memory 21. Certain addresses identified in the protocol as IEEE 802.2 LLC DSAP and IEEE 802.2 LLC SNAP can be filtered by checking against items stored in the CAM 23, e.g., 256 entries.

For address lookup, the controller 10 implements an optimized hash algorithm which can perform a 48-bit address lookup in at most four references to the external memory 21. The hash function is programmable, and is specified by a 48-bit value called the hash function. The lookup includes one memory reference to a hash table in memory 21, followed by at most three references to the translation database which contains a breadth-first binary tree in which hashed 48-bit addresses are stored, as will be explained.

The controller 10 supports exact matching of certain 48-bit destination addresses (group or individual), certain 48-bit source addresses, 8-bit DSAP and 40-bit PID fields, by an interface to the external CAM 23. The controller 10 can obtain by interface 24 a 14-bit associated data field for each entry stored in the CAM 23. The ability to match data fields of varying byte widths is achieved by specifying a type code field driven by the controller 10 during the reception of packets. The bits of the type code indicate the size of the field to match in the CAM array 23 and the type of key data. A key can be from one to six bytes in length. When a 48-bit destination or 48-bit source address is found as an entry in the CAM 23, the controller inhibits the hash lookup for this value.

The controller 10 provides programmable rate limits to throttle the packet rate and limit the transmit queue length of excess packets that are destined for switch processing engines. For example, these rate limits would be applied to errored packets, monitor packets, or bridge learning packets with an unknown source address to be sent to the controller 38 for the switch 12.

The controller 10 performs output port filtering based on the added header protocol class, and performs parity checking of the crossbar data path.

The controller 10 can be used to attach a variety of links to the crossbar 12. The parameters that define the operation of controller 10 describe the type of link to which the controller 10 is attached through the MAC interface 19a, 19b, the type of inbound and outbound forwarding procedures it is to perform, and the format of the packets it is to handle.

All external links are attached to the controller 10 through the MAC interface 19a, 19b. Any physical channel can be attached to the controller 10 through a formatter that adheres to the specification of the MAC receive and transmit data paths 19a, 19b. The MAC interface 19a, 19b and the controller 10 can operate in either half or full duplex modes. The crossbar interface 14, 15 of the controller 10 is a full duplex interface that can establish connections and transmit to the crossbar 12 while simultaneously accepting connections and receiving frames from the crossbar.

In addition to the behavior of the links (i.e., data rate and duplex mode), the services that the controller 10 is to provide for the traffic on the attached link 11 must be specified. This aspect of link specification defines the controller 10 inbound and outbound forwarding/filtering procedures and additionally defines the format of the frames which the controller 10 will process. The controller 10 can attach to three types of links, particularly bridge links, internal switch links, and relay links.

Figure 3:
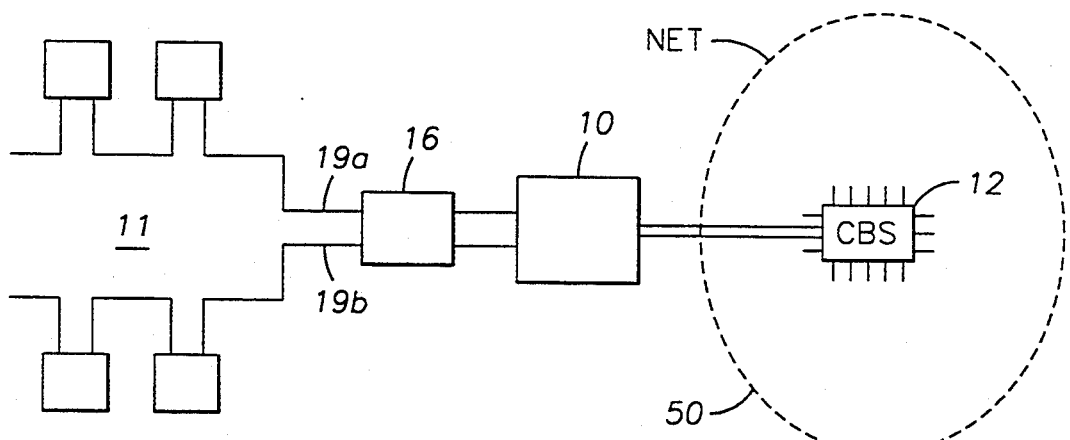
FIG. 3 is a diagram of a controller of FIG. 1 and 1a connected in a network.

A bridge link attaches a network segment 11 of an extended LAN to the net. That is, referring to FIG. 3, what may be thought of as a higher level network 50 (referred to also as the "GigaNet") contains the crossbar switch 12 as one of its elements, and the controller 10 is the bridge between the FDDI link 11 and the net 50. Of course, many other LANs such as the FDDI 11 or Ethernet LANs, etc., would be connected to the net 50 via other ports 13 of the crossbar switch 12, or through other crossbar switches 12 in the net 50 (using other controllers 10 or their equivalent). Within the net 50, the crossbar device 12 may function as classic point-to-point connector, or as set forth in the above-mentioned copending applications, may create a ring or bus, or may be create a mixed configuration of rings, buses and point-to-point connectors. The controller 10 will expect to receive and transmit frames in FDDI format at the MAC interface 19a, 19b, and will perform inbound lookups on the destination address, source address, and protocol fields, and translate the packet to switch frame format. The controller 10 will perform outbound checks and will perform protocol class lookup on the switch frames received from the crossbar 12 and translate the frames back to FDDI frame format prior to transmission to the MAC interface 19a, 19b.

An internal switch link connects switches in the net 50 together or attaches net end nodes to the net 50. Again, the controller 10 can operate in this switch link mode. In this mode, the controller 10 will expect to receive and transmit frames in switch frame format at its MAC interface 19a, 19b. It will perform inbound checks on the switch frame and transmit the packet to the crossbar 12. The controller 10 will perform outbound checks on the switch frame received from the crossbar and will transmit to the MAC interface 19a, 19b a switch frame.

A relay link uses a full duplex FDDI link to attach switches 12 in the net 50 together. The controller 10 functioning in this mode will expect to receive and transmit frames in a relay frame format at the MAC interface 19a, 19b, and here its operation is similar to switch link attachment and simply translates the packet format by adding or stripping a local packet header.

The type of link (bridge link, switch link, or relay link) that the controller 10 is attached to at the MAC interface 19a, 19b is specified by either decoding the frame control field of the received packet or by a type field in a control register 41 within the controller 10.

Once the link type that the controller 10 is attached to is specified, the inbound and outbound processes 27, 29, 31, and 33 know the format of the frames that will be processed and the forwarding procedures it is to perform.

Figure 4:
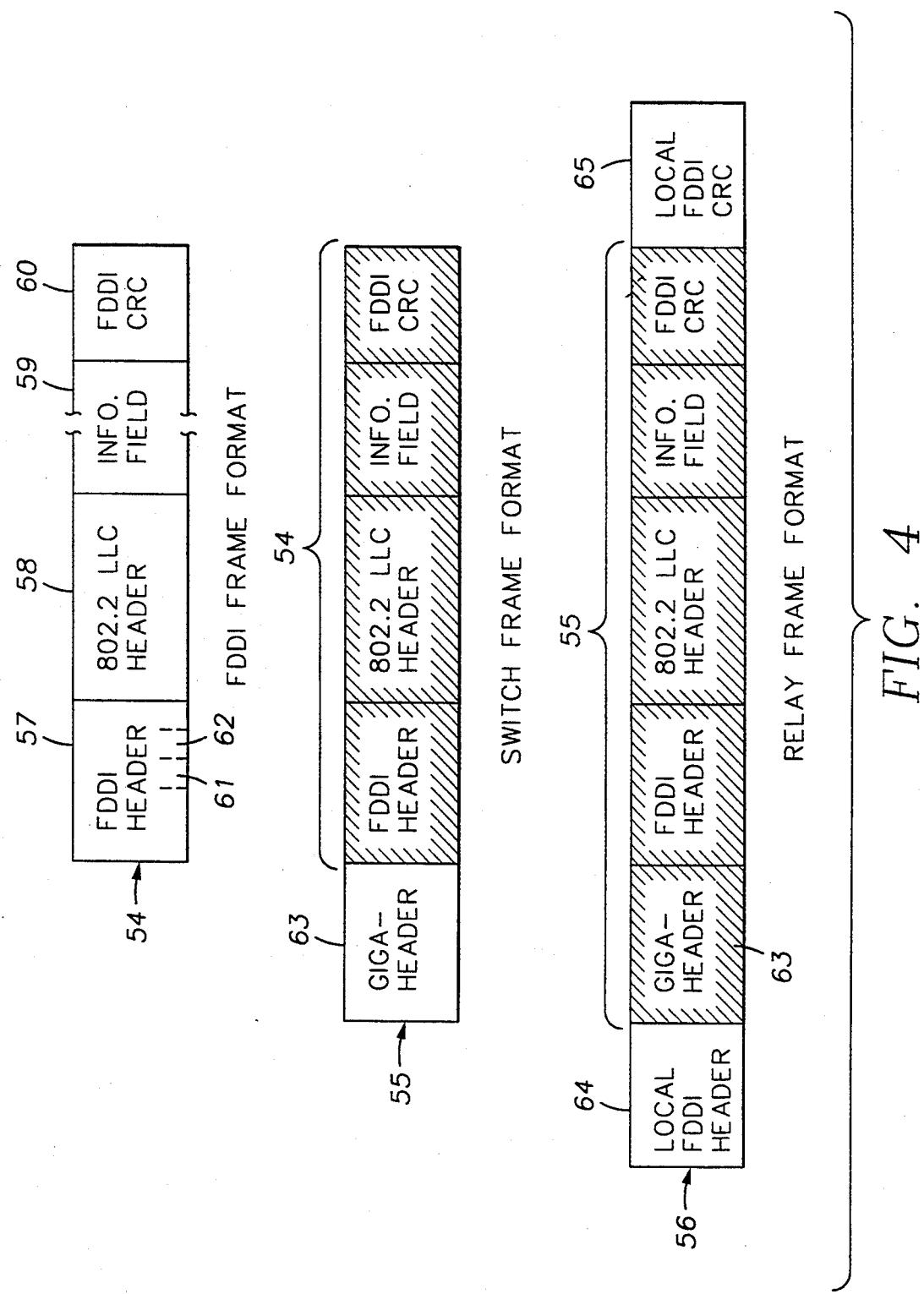
FIG. 4 is a diagram of frame formats used in the network of FIGS. 1 or 3.

Referring to FIG. 4, the three different frame formats that may exist at the MAC interface 19a, 19b are illustrated, including an FDDI frame format 54, a switch frame format 55 (which encapsulates the FDDI frame 54), and a relay frame format 56 (which encapsulates the switch format 55).

The original FDDI frame format 54 is of the form specified by the FDDI protocol, and will not be described in detail. Within the FDDI format 54 are an FDDI header 57, an 802.2 LLC header 58, an information field 59 (the payload), and an FDDI CRC field 60. Various other elements such as starting and ending delimiters are present. Within the header 57 are 48-bit source and destination addresses 61 and 62, and these are used in the address lookups as described herein. Other special addresses or identification specified in the protocol are contained in the LLC header 58, such as the ones mentioned above (DSAP and SNAP). Each of these addresses is extracted by the controller 10 and used for lookups and filtering as described herein. The FDDI frame format 54 is found at the MAC interface 19a, 19b of the controller 10. When attached to bridge links, this will be the format of the frames received by the IR process 27 and will be the format of frames transmitted by the OT process 33.

The switch frame format 55 of FIG. 4 is seen to be merely the original FDDI frame 54 to which is attached at the beginning an added header 63, also referred to as the "gigaheader". This added header 63 is described in detail below and is the subject of the above-identified copending application Ser. No. 07/965,651. The switch frame format 55 can appear on both the MAC interface 19a, 19b and the crossbar interface 14, 15. At the crossbar interface 14, 15, this is the common packet format used by the switch ports 13. It is the format transmitted by the IT process 29, and it is the format received by the OR process 31.

The relay frame format 56 of FIG. 4 consists of a switch frame format 55 (including FDDI format 54 and added header 63), to which is added a local FDDI header 64 and a local FDDI CRC field 65. The local FDDI header 64 is of the same specification as the FDDI header 57, and is defined in the FDDI protocol. This type of frame 56 is found at the MAC interface 19a, 19b of the controller 10 when it is attached to a relay link.

Figure 5:
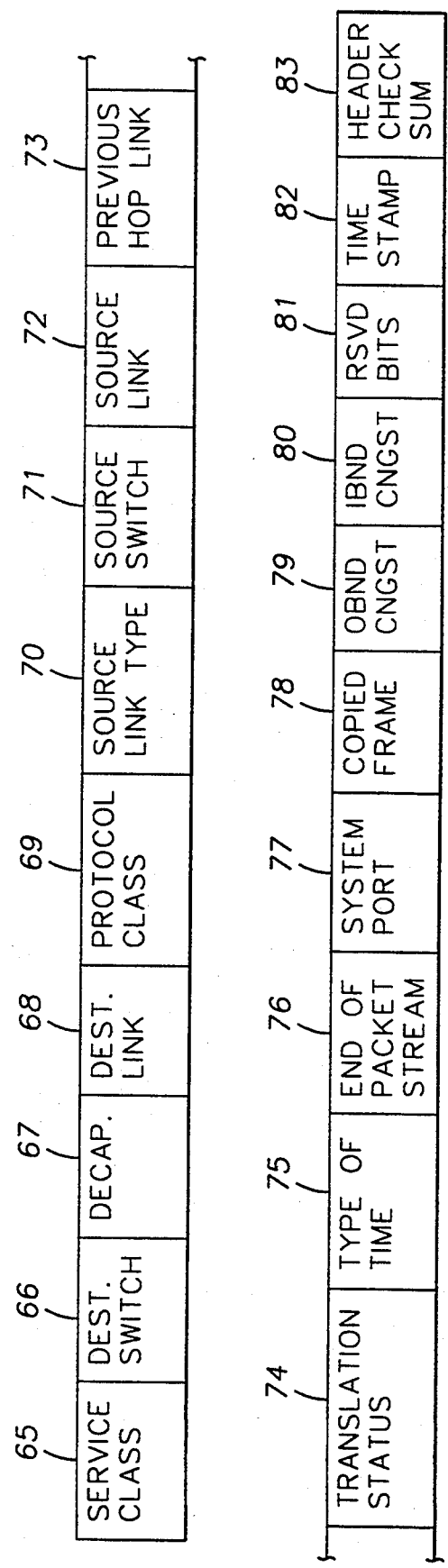
FIG. 5 is a diagram of the fields contained in an added header in the formats of FIG. 3.

Referring to FIG. 5, the added header 63 (or "gigaheader") is a thirteen byte (104-bit) field that is present in switch frames 55 and relay frames 56. It contains information that is generated by the inbound receive (IR) process 27 when a packet first enters the net 50 and is used to direct the packet to its destination within the net 50. This field 63 defines how the packet is to be serviced within the net 50. The packet processing within the net 50 is performed by examining the fields of this added header 63. Each of the fields in the added header 63 will now be described.

The service class field 65 is a four-bit field that specifies the service class for the packet. For the receivers of the controller 10, the service class is used to determine the queue number in memory 21 that a packet is to be placed on by doing a lookup using certain internal registers 41. On the crossbar 12, the service class is also used for connection queue servicing.

The destination switch field 66 is a 12-bit field representing the switch number (i.e., local address) of the final destination of the packet within the net 50. When a packet is received from an FDDI link 11, the IR process 27 performs a lookup operation to derive the destination switch value for the packet. A 12-bit field allows 4096 ports; a single crossbar 12 has only thirty-six ports in one embodiment, so the need for a 12-bit address is because a number of the crossbars 12 may be within a net 50, and to allow for expansion to larger crossbars and larger nets 50. Certain switch values are reserved: $02_{hex}$ and $03_{hex}$ indicate that the final destination is unknown to the IR process 29, and $00_{hex}$ and $01_{hex}$ indicate that the final destination address is to be filtered at this port. Other values derived for this field will direct the packet to its destination within the switch.

The decapsulate bit 67, when set to one, indicates that this packet is to be decapsulated when it goes out onto a link that supports both relay and bridge frames. The outbound processes 31 and 33 of the controller 10 will sample this bit to make a determination of the transmission format to use. Usually this bit is set to zero.

The destination link 68 is a 7-bit field representing the logical link number of the final destination of the packet, except when switch field 66 equals $00_{hex}$, in which case this field 68 is the physical link number of the port that is to receive the message. The IR process 29 will generate this field when constructing the added header 63 for frames received from the FDDI interface 19a, 19b. When enabled, the OR process 31 will compare this field to its own logical link number to verify that the crossbar connection is established in the correct port. Logical link numbers 00-to-$07_{hex}$ are reserved for addressing the switch control processors x for switches 12 in the net 50.

The protocol class field 69 of FIG. 4 is an 8-bit field representing the protocol class assigned to the packet within the net 50. The IR process 29 will generate this field 69 when constructing the added header 63 for frames received from the FDDI interface 19a, 19b. The OR process 31 will sample this field 69 for frames received from the crossbar 12 to determine if the packet is enabled to be forwarded in the outbound direction. The values F0-to-$FD_{hex}$ of this field 69 are reserved for special net-wide protocols such as inter-switch control messages, initialization protocols, implementation of protocol trapping, and frames destined for a line control processor 25. The values FE and $FF_{hex}$ are used as filter protocol values. All other numbers are user-assignable.

The source link type field 70 is a four bit field representing the type of data link that sourced the packet that the current added header 63 is attached to. This field 70 can be used to specify additional translation processing during the forwarding of the frame. The controller 10 does not use this field during packet processing.

The source switch field 71 is a 12-bit field representing the switch number of the original source of this packet in the net 50. The values 00-to-$03_{hex}$ are illegal on all data links, and certain ones are reserved; all other numbers are user assignable.

The source link field 72 is a 7-bit field representing the logical link number of the original source of this packet in the net 50. The values 00-to-$07_{hex}$ are reserved for use by the switch control processor x.

The previous hop link field 73 is a 7-bit field representing the physical link number of the previous hop link. Thus it represents the link number that is currently sending the packet to the crossbar 12.

The translation status field 74 is a 4-bit field which stores the result of the automatic translation performed on the current packet. The status may indicate whether the frame is to be forwarded to its destination, monitored, trapped, logged, or whether the source address of the frame was "new."

The type of time field 75 of FIG. 4 is a 1-bit field representing the format for the timestamp in the current packet. When this bit is "0" the timestamp field represents absolute time, and when set to "1" the time stamp field is interpreted as a relative time to live.

The end-of-packet stream field 76 is a 1-bit field which, when set to one, indicates that this packet is the last packet in a packet stream. Otherwise, when set to zero, it indicates the first or a middle packet in a packet stream.

The system port field 77 is a 1-bit field which, when set to one, indicates that this packet is being sent from a system port (e.g., a switch control processor x port). This bit can be used during outbound packet processing to restrict certain types of packet to originate only from system ports.

The copied frame field 78 is a 1-bit field which, when set to one, indicates that a copy frame is being sent to the crossbar 12. Copy frames are used to send exception traffic to engines within the switch 12.

The outbound congestion bit 79 is a 1-bit field that is used to associate outbound congestion information with the added header 12 of the current packet. The inbound congestion bit 80 is a 1-bit field that is used to associate inbound congestion information with the added header 12 of the current packet.

The timestamp field 81 is a 16-bit field representing a value from 00 to 65535 which is either the lowest 16-bits of an absolute time that the packet must be destroyed, or the number of time units the packet has to live. One time unit is 10-milliseconds. The timestamp is generated by the inbound receive process 27.

Reserved field 82 represents 4-bits reserved for future specification. These should be sent as zeros and otherwise ignored.

The header check field 83 is an 8-bit CRC covering the previous 96-bits of the 104-bit added header 63 (the "gigaheader").

The frame translation performed within the controller 10 will now be described. The controller 10 forwards inbound and outbound frames and performs the necessary translation to generate the desired packet formats 54–56, e.g., adding the header 63 if necessary. The forwarding and translation procedures that are performed by the processes 27, 29, 31, and 33 of the controller 10 are a function of the link type that the controller 10 is attached to and of course a function of whether the packet is inbound or outbound.

For inbound processing of a packet received where the MAC link type is "bridge" and the MAC frame format is FDDI format 54, with the crossbar switch 12 frame format being "switch" format 55, the actions performed are:

Perform a lookup of the frame control field of the received packet. Process the destination address 61, source address 62, and protocol fields of the inbound FDDI frame 54. Determine if the packet is to be forwarded/monitored and if there are any exception conditions. Generate the service class field 65, the destination switch field 66, the destination link field 68, and the protocol class field 69. Add a timestamp field 82 and the remaining header 63 fields to form a switch frame 55. Queue the packet in memory 21.

For inbound processing of a packet received where the MAC link type is "bridge" and the MAC frame format is "bridge" format 55, with the crossbar switch 12 frame format being "switch" format 55, the actions performed are:

Perform a CAM lookup in CAM 23 using the protocol class field 69 of the received header 63. Check if the packet is to be monitored or trapped. Clear the system port bit 77 and check the timestamp 82 and checksum 83 for the header 63. Add the updated header 63 to the frame.

For inbound processing of a packet received where the MAC link type is "relay" format 56 and the MAC frame format is "relay" format 56, with the crossbar switch 12 frame format being "switch" format 55, the actions performed are:

Perform a lookup of the frame control field of the received packet. The local header 64 is checked and removed from the relay frame 56. The procedure then proceeds as specified by the switch link.

For outbound processing of a packet received where the MAC link type is "bridge," the crossbar switch 12 frame format is "switch" format 55, and the MAC frame format is FDDI format 54, the actions performed are:

Check added header 63 checksum 83 for the received frame. Check the fields of the header 63, including destination switch field 66, destination link field 68, and system port bit 77. Perform protocol class lookup for field 69. Verify that the timestamp 82 is still good, if not discard the frame. Strip header 63 from the packet to realize an FDDI frame format 54.

For outbound processing of a packet received where the MAC link type is "switch," the crossbar switch 12 frame format is "switch" format 55, and the MAC frame format is "switch" format 55, the actions performed are:

Check the added header 63 checksum 83 for the received frame. Check the fields of the header 63, including destination switch field 66, destination link field 68, and system port bit 77. Perform protocol class lookup for field 69. Verify that the timestamp 82 is still good, if not discard the frame.

For outbound processing of a packet received where the MAC link type is "relay," the crossbar switch 12 frame format is "switch" format 54, and the MAC frame format is "relay" format 56, the actions performed are:

The local header 64 is added to the switch frame 55. The procedures then proceed just as specified by the switch link, i.e., the frame is treated as if it were an FDDI frame 54.

During the frame forwarding procedure, the controller 10 makes use of several lookup mechanisms to process the fields of the frame. These include the CAM lookup, the hash lookup, a class specifier lookup, and a protocol class lookup.

The CAM lookup consists of applying an address or value to the CAM 23, and getting back an indication of whether or not a match is found in the CAM 23. The CAM 23 is of limited size due to the cost (number of transistors) inherent in constructing a CAM. In an example embodiment, the CAM 23 holds 256 entries. Thus, there can be 256 values (addresses, etc.) that are searched for in a CAM lookup. The IR process 27 uses the CAM lookup to perform matches using the various fields of the received frame 54, 55, or 56 as keys. Variable width key matching is provided, up to six bytes wide, and this is specified by the IR process 27 during the parse of the frame, and a match result return an associated data value that will be used by the IR process 27. This CAM match can be used to find the frame control, destination address, source address, DSAP and SNAP fields of bridge and relay link packets. It can also be used to find the protocol class field 69 of the added header 63 of the switch link packets 55.

A protocol class lookup is performed by the OR process 31 to determine if the protocol class field 69 in the added header 63 for a frame received from the crossbar switch 12 via line 15 indicates that this protocol class is enabled to be forwarded outbound.

Figure 6:
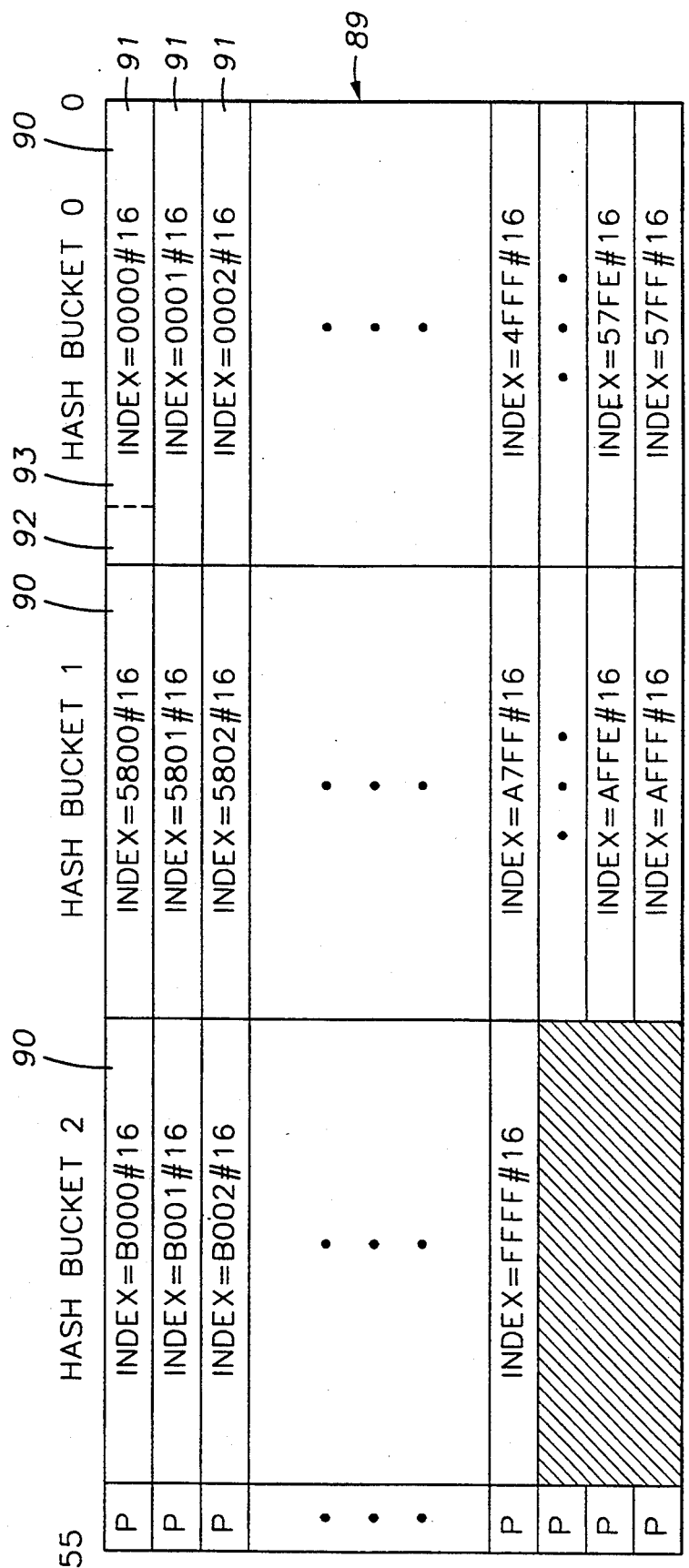
Figure 7:
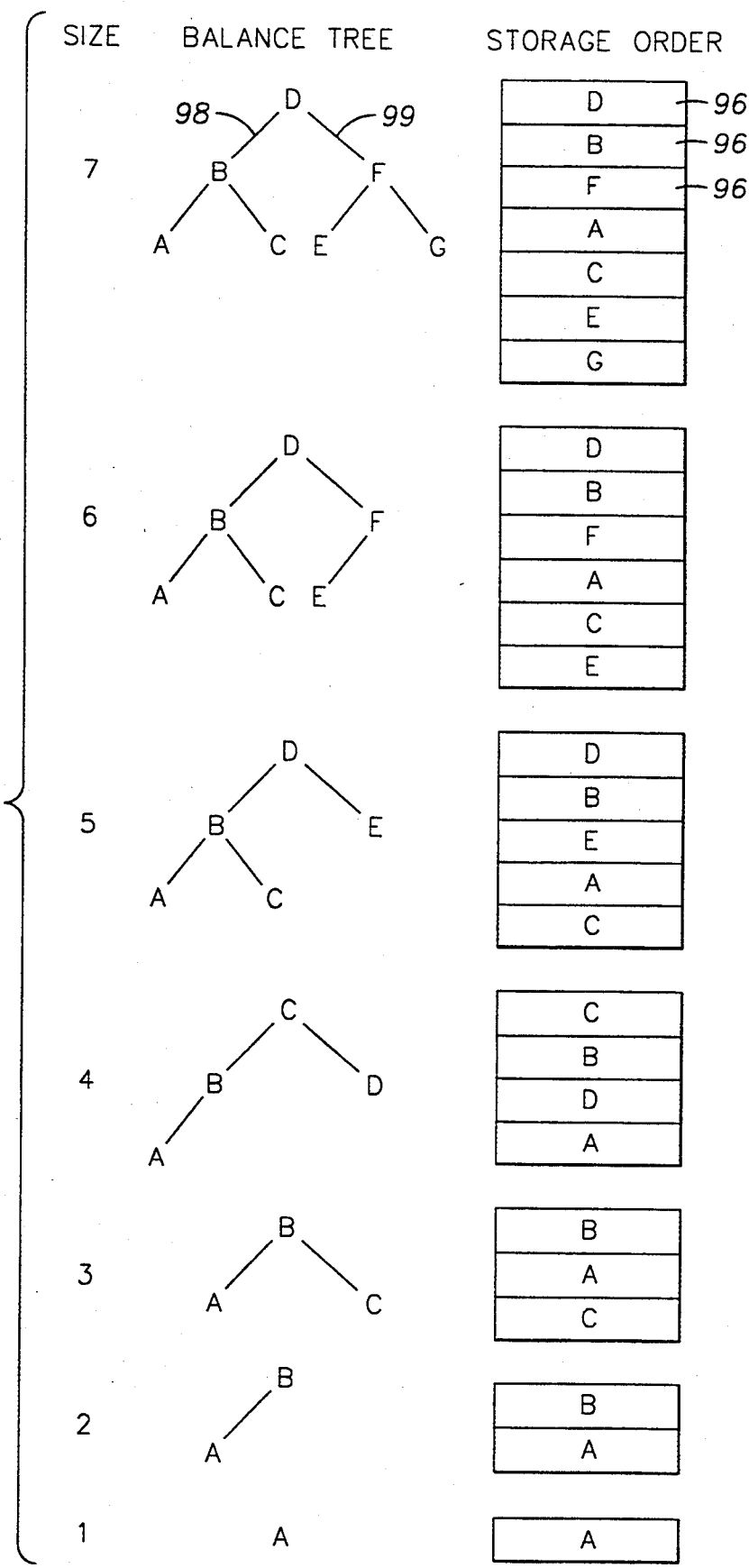
FIG. 7 is a diagram of breadth-first binary trees used in the method of the invention, to store translated addresses.

The hash lookup is an important feature of the invention. A hash lookup is used by the IR process 27 (in conjunction with a CAM lookup) to process the 48-bit destination and source fields 61 and 62 of received frames. The 48-bit addresses 61 and 62 may be globally unique addresses, i.e., each station may have an address that is unique to that station. The address range covers $2^{40}$ or approximately $3 \times 10^{14}$ (300 trillion) unique values, so an address may never need to be duplicated in any foreseeable systems. Within an extended network, however, the number of unique addresses needed is usually only a few thousands or at most tens of thousands. Therefore, a table of all of the addresses being used in a network at a given configuration only contains, for example, a maximum of 64K or $2^{16}$, entries, which would use merely a 16-bit address. For this reason, the 48-bit globally-unique address 61 or 62 is hashed, producing a 16-bit locally-unique address. An incoming address field 85 as seen in FIG. 5 is subjected to a hash function 86 to produce another 48-bit value 87, then a 16-bit part 88 of this 48-bit value 87 (the least significant 16-bit field) is used to index into a 64K-entry table in memory 21, this being referred to as the hash table 89. Each word of the memory 21 is 56-bits wide, so a word can contain three of these hash entries, in three "hash buckets" 90 for each word 91, as seen in FIG. 6. When a hashed address 87 is generated during the processing of packets, the 16-bit index 88 is used to select one of the 22K words 91 in the hash table 89 and one of the three hash buckets 90 at this index. Each bucket 90 is an 18-bit field containing a 3-bit value 92 indicating the bucket size, one to seven entries, and a 15-bit field 93 acting as a translation table pointer. The 16-bit input 88 indexes to a word 91 depending upon its lower order bits and one-of-three buckets 90 in a word 91 depending upon its higher ordered bits, indexed for one-of-22K selection of the word 91 in the table. The translation table pointer 93 returned by the hash bucket 90 in the hash table 89 is used to select a breadth-first balanced binary tree as illustrated in FIG. 7. The trees are stored in a translation table 94 in memory 21, and each tree has between one and seven entries, as indicated by the size field 92. The binary tree cannot cross a block boundary in the translation table 94 in memory 21. The ordering of entries 96 in a breadth-first balanced binary tree for various table sizes is illustrated in FIG. 7. Note that there are from one to seven entries (each entry a 48-bit address) in a tree, ordered such that $$A<B<C<D<E<F<G$$

Each entry 96 contains 32-bit hash remainder field 97 that is left after using the low-order 16-bit value 88 from the hashed 48-bit address to store an address. To traverse the tree, the IR process fetches the first entry 96, and the 32-bit value 97 in this entry is compared to the upper 32-bit value 97 of the incoming hashed address 87 (from the packet being evaluated). If the two values match, the remaining fields of the entry 96 in the translation table 94 provide the IR process 27 with the information it needs for processing that field of the packet. Otherwise, the IR process will continue traversing the binary tree by selecting the next entry as a function of whether the has remainder is less than or greater than the current entry 96. The hash remainders 97 are compared, and if the incoming value 97 is less than the stored value 97 the left branch 98 is picked, while if greater than the right branch 99 is picked. The tree traversal will continue until a match is found until a match is found or the tree is exhausted. For each hash lookup and tree traversal, up to four memory requests to external memory 21 will be made by the IR process 27. One memory request is required to obtain the hash bucket 90, and then up to three more memory requests are needed to traverse the binary tree of FIG. 7 (e.g., D-B-C of the 7-entry tree). The arbiter of the PM process 35 provides priority service for memory requests associated with this search process in the IR process 27, and will allocate up to every other memory cycle for the IR lookup during packet reception.

Figure 8:
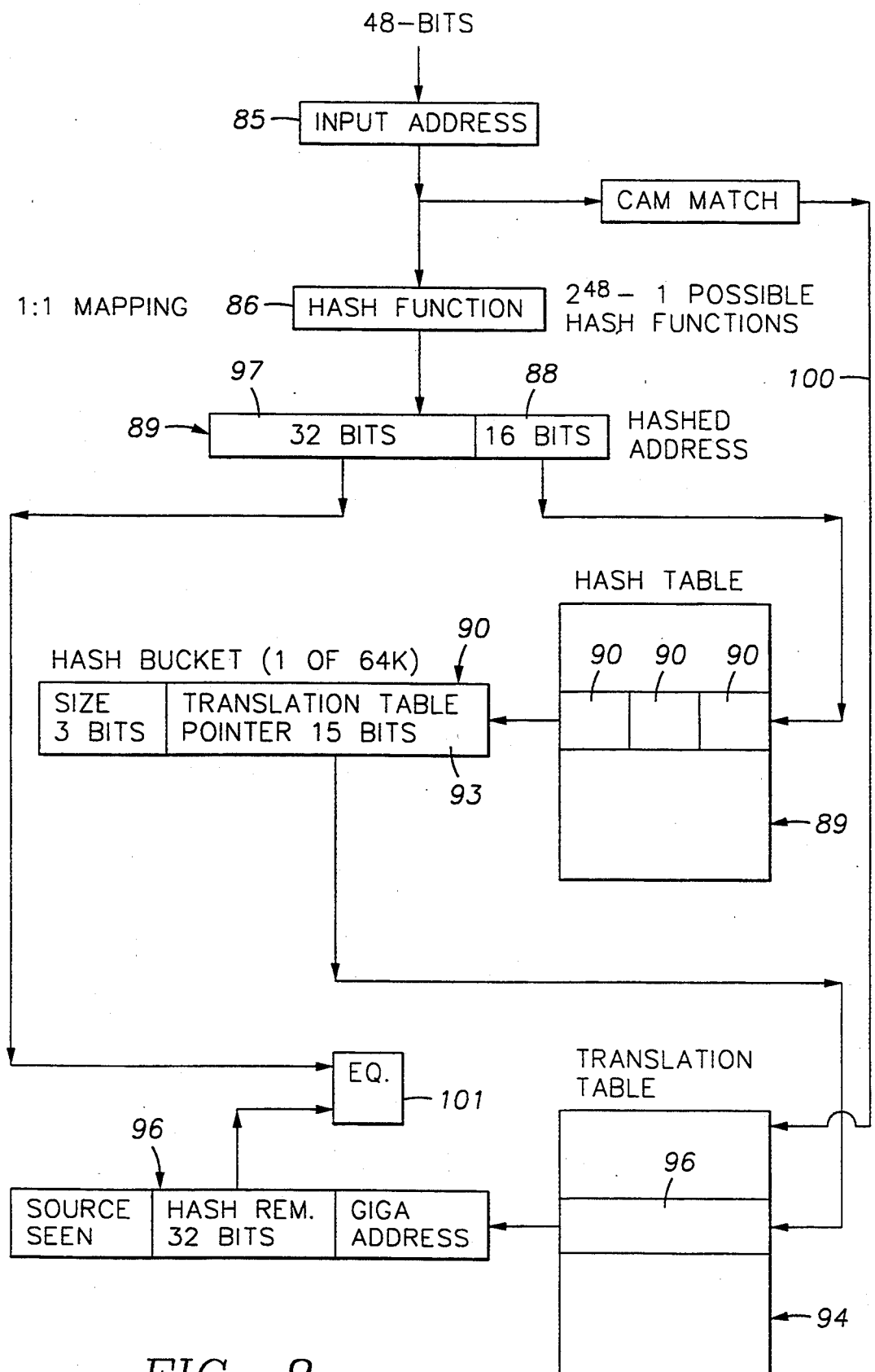

The address lookup procedure used by the IR process 27, as just described, is also illustrated in FIG. 8. The 48-bit destination address 61 from an incoming packet is simultaneously subjected to the hash function 86 and a CAM match; if a CAM match is found in CAM 23, an index into the translation table 94 is immediately generated as indicated by the line 100. If not, the 16-bit field 88 of the hashed address 87 is used to index into the hash table 89 to select a hash bucket 90, and this selected hash bucket contains a pointer 93 into the translation table 94. The binary tree found in the translation table 94 will have a size indicated by the 3-bit field 92. Each entry 96 in the tree has a 32-bit remainder field 97 which is compared at comparator 101 with the 32-bit remainder in the hashed address 87 to either find a match or progress through the tree from a maximum of three fetches.

When the hash function 86 is implemented to build the hash table 89 and translation table 94, as upon initialization of a network and whenever the network is reconfigured by adding stations or bridges, there is a small but finite probability that more than seven addresses will hash to the same bucket. If this occurs, the address producing the collision in trying to load the table will be stored in the CAM 23. Perhaps thirty-two or so of these collision addresses can be stored in the 256-entry CAM 23 without degrading its other functions. Thus, since every address is compared with the CAM entries anyway (to filter for multicast messages, SNAP filtering, etc.), and this compare in the CAM is done in parallel with the hash function, the CAM compare is without cost in time or new circuitry. Were this outlet not available, the occurrence of more than seven entries for a hash bucket would result in the necessity to chose a new hash function and recalculate all the addresses to rebuild the hash table 89 and the translation table 94; this would require a period of down time where the controller 10 could not respond to incoming traffic since the hash and translation tables would be unavailable, and processor time would be monopolized by the rebuild. The 48-bit source and destination addresses are often not randomly selected, but instead are assigned in blocks or patterns and otherwise increase the likelihood of hashing to the same bucket. Alternatively, one way of avoiding the consequences of having to rebuild the hash table 89 is to generate two hash tables in memory 21 using two different hash functions, so if the one being used generates a collision (more than seven in a hash bucket), processing switches to the alternate hash table where a collision is very unlikely; this requires extra size for memory 21, however. The availability of the CAM lookup for instances where there are a few collisions in loading the hash buckets has the advantage of not imposing any significant burden in time or in memory usage.

In the Appendix, the details of the data structures and lookup algorithms used in the method of FIG. 8 are presented in pseudo-code. Particularly, the HashFunction, ReadHashBucket, and AddressLookUp functions are presented, and the BinarySearch and HashLookUp procedures are presented.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments which fall within the true scope of the invention.

Appendix

```
PACKAGE FGC_LOOKUP IS

SUBTYPE Byte        IS Bit_Vector(7 DOWNTO 0);
TYPE ByteVector     IS ARRAY (Natural RANGE <>) OF Byte;
SUBTYPE AddressType IS ByteVector(0 TO 5);

TYPE GigaAddressType IS
    RECORD    -- 21 bit value.
       linkNumber:    Bit_Vector(6 DOWNTO 0);       --  7 Bits.
       decapsulate:   Boolean;                      --  1 Bit.
       switchNumber:  Bit_Vector(11 DOWNTO 0);      -- 12 Bits.
       extraBit:      Bit;                          --  1 Bit.
    END RECORD;

CONSTANT NO_CAM_MATCH: Bit_Vector(12 DOWNTO 0) := B"0_0000_0000_0000";

SUBTYPE HashRemainderType IS Integer RANGE 0 TO (2**32)-1;
SUBTYPE LookupTableIndex  IS Integer RANGE 0 TO 32767;

TYPE LookupRecordType IS
    RECORD    -- 56 bit value.
       gigaAddress:    GigaAddressType;             -- 21 Bits <0:20>.
       hashRemainder:  HashRemainderType;           -- 32 Bits <21:52>.
       srcAddrSeen:    Boolean;                     --  1 Bit  <53>.
       parityCheck:    Bit_Vector(1 DOWNTO 0);      --  2 Bits <54:55>.
    END RECORD;

! The lookup table requires up to 32K PM words (could be 4K, 8K, 16K or 32K).
VARIABLE lookupTableSize IS LookupTableIndex;
VARIABLE lookupTable: ARRAY(lookupTableSize) OF LookupRecordType;

TYPE HashBucketType IS
    RECORD    -- 18 bit version (3 of these + parity fit into one 56-bit PM word).
       lookupTablePtr:  lookupTableIndex;   -- 15 Bits.
       bucketSize:      Integer RANGE 0 TO 7;    --  3 Bits.
    END RECORD;

TYPE SmallArrayOfHashBuckets IS ARRAY (0 TO 2) OF HashBucketType;
TYPE HashTableEntry IS
    RECORD -- 56 bit version (3 buckets/PM word)
       hashBuckets:   SmallArrayOfHashBuckets;     -- 54 Bits.
       parityCheck:   Bit_Vector(1 DOWNTO 0);      --  2 Bits.
    END RECORD;

-- The hash table holds 65536 HashBucket's, which requires 22528 PM words,
-- since there are 3 HashBuckets per word.
TYPE ArrayOfHashEntries IS ARRAY (Integer RANGE <>) OF HashTableEntry;
VARIABLE hashTable: ArrayOfHashEntries(0 TO 22527);
```

```
FUNCTION HashFunction (addr: IN AddressType)
    RETURN Bit_Vector(47 DOWNTO 0) IS VARIABLE M:         Bit_Vector(47 DOWNTO 0);
VARIABLE result:    Bit_Vector(47 DOWNTO 0);
VARIABLE R:         Bit_Vector(0 TO 47);
VARIABLE nibble:    Bit_Vector(0 TO 3);
VARIABLE A:         Bit_Vector(0 TO 3);
VARIABLE Q:         Bit_Vector(0 TO 3);
VARIABLE byteIndex: Integer RANGE 0 TO 6;

FUNCTION "+" (left, right: Bit) RETURN Bit IS
    BEGIN
        RETURN left XOR right;
    END "+";
    FUNCTION "*" (left, right: Bit) RETURN Bit IS
    BEGIN
        RETURN left AND right;
    END "*";

BEGIN
-- Take a 48 bit random number supplied by the Central Processor, called M.
-- Calculate H where H = M*addr MOD G, where the arithmetic is performed
-- in the field of polynomials of degree 48 over the Galois field of order 2,
-- and where G(X) = X**48 + X**36 + X**25 + X**10 + 1.  The algorithm processes
-- each of the 12 nibbles (semi-octets) of the address one at a time.

R := X"00_00_00_00_00_00";
M := programmableHashMultiplier;

FOR byteIndex IN 0 TO 5 LOOP
  FOR nibbleIndex IN 0 TO 1 LOOP
    IF nibbleIndex = 0 THEN
        nibble := addr(byteIndex)(0 TO 3);
    ELSE
        nibble := addr(byteIndex)(4 TO 7);
    END IF;

-- Multiply each nibble by the 48 bit (degree 47) polynomial M, add this to
    -- the partial result multiplied (i.e. shifted) by X**4 - obtaining a 52 bit
    -- (degree 51) value. The next partial result is then this value MOD G.
    -- Note that all arithmetic is polynomial arithmetic over the Galois field
    -- of order 2 (i.e. GF(2)) and also note that multiplication in GF(2) is
    -- equivalent to ANDing and addition is equivalent to XORing.
    -- Hence:  result := (nibble*M + result*X**4) MOD G.

-- Note that Q(3..0) represents the quotient (degree 3) when the degree 51
    -- intermediate value is divided by the degree 48 polynomial G(X). To obtain
    -- the MOD of the intermediate value by G(X) we simply add the product
    -- Q(X)*G(X) to the intermediate value. Obviously the top 4 bits (of degree
    -- 48 to 51) become zero and we are left with the result of degree 47.
    -- REMEMBER: Multiplication below is implemented with a 2 input AND gate and
    -- addition below is implemented with a tree of XOR gates--

A := nibble;

Q(3)  := R(47);
    Q(2)  := R(46) + A(3)*M(47);
    Q(1)  := R(45) + A(3)*M(46) + A(2)*M(47);
    Q(0)  := R(44) + A(3)*M(45) + A(2)*M(46) + A(1)*M(47);

R(47) := R(43) + A(3)*M(44) + A(2)*M(45) + A(1)*M(46) + A(0)*M(47);
    R(46) := R(42) + A(3)*M(43) + A(2)*M(44) + A(1)*M(45) + A(0)*M(46);
    R(45) := R(41) + A(3)*M(42) + A(2)*M(43) + A(1)*M(44) + A(0)*M(45);
    R(44) := R(40) + A(3)*M(41) + A(2)*M(42) + A(1)*M(43) + A(0)*M(44);
    R(43) := R(39) + A(3)*M(40) + A(2)*M(41) + A(1)*M(42) + A(0)*M(43);
    R(42) := R(38) + A(3)*M(39) + A(2)*M(40) + A(1)*M(41) + A(0)*M(42);
    R(41) := R(37) + A(3)*M(38) + A(2)*M(39) + A(1)*M(40) + A(0)*M(41);
    R(40) := R(36) + A(3)*M(37) + A(2)*M(38) + A(1)*M(39) + A(0)*M(40);
    R(39) := R(35) + A(3)*M(36) + A(2)*M(37) + A(1)*M(38) + A(0)*M(39) + Q(3);
    R(38) := R(34) + A(3)*M(35) + A(2)*M(36) + A(1)*M(37) + A(0)*M(38) + Q(2);
    R(37) := R(33) + A(3)*M(34) + A(2)*M(35) + A(1)*M(36) + A(0)*M(37) + Q(1);
    R(36) := R(32) + A(3)*M(33) + A(2)*M(34) + A(1)*M(35) + A(0)*M(36) + Q(0);
    R(35) := R(31) + A(3)*M(32) + A(2)*M(33) + A(1)*M(34) + A(0)*M(35);
    R(34) := R(30) + A(3)*M(31) + A(2)*M(32) + A(1)*M(33) + A(0)*M(34);
    R(33) := R(29) + A(3)*M(30) + A(2)*M(31) + A(1)*M(32) + A(0)*M(33);
    R(32) := R(28) + A(3)*M(29) + A(2)*M(30) + A(1)*M(31) + A(0)*M(32);
    R(31) := R(27) + A(3)*M(28) + A(2)*M(29) + A(1)*M(30) + A(0)*M(31);
    R(30) := R(26) + A(3)*M(27) + A(2)*M(28) + A(1)*M(29) + A(0)*M(30);
```

```
        R(29) := R(25) + A(3)*M(26) + A(2)*M(27) + A(1)*M(28) + A(0)*M(29);
        R(28) := R(24) + A(3)*M(25) + A(2)*M(26) + A(1)*M(27) + A(0)*M(28) + Q(3);
        R(27) := R(23) + A(3)*M(24) + A(2)*M(25) + A(1)*M(26) + A(0)*M(27) + Q(2);
        R(26) := R(22) + A(3)*M(23) + A(2)*M(24) + A(1)*M(25) + A(0)*M(26) + Q(1);
        R(25) := R(21) + A(3)*M(22) + A(2)*M(23) + A(1)*M(24) + A(0)*M(25) + Q(0);
        R(24) := R(20) + A(3)*M(21) + A(2)*M(22) + A(1)*M(23) + A(0)*M(24);
        R(23) := R(19) + A(3)*M(20) + A(2)*M(21) + A(1)*M(22) + A(0)*M(23);
        R(22) := R(18) + A(3)*M(19) + A(2)*M(20) + A(1)*M(21) + A(0)*M(22);
        R(21) := R(17) + A(3)*M(18) + A(2)*M(19) + A(1)*M(20) + A(0)*M(21);
        R(20) := R(16) + A(3)*M(17) + A(2)*M(18) + A(1)*M(19) + A(0)*M(20);
        R(19) := R(15) + A(3)*M(16) + A(2)*M(17) + A(1)*M(18) + A(0)*M(19);
        R(18) := R(14) + A(3)*M(15) + A(2)*M(16) + A(1)*M(17) + A(0)*M(18);
        R(17) := R(13) + A(3)*M(14) + A(2)*M(15) + A(1)*M(16) + A(0)*M(17);
        R(16) := R(12) + A(3)*M(13) + A(2)*M(14) + A(1)*M(15) + A(0)*M(16);
        R(15) := R(11) + A(3)*M(12) + A(2)*M(13) + A(1)*M(14) + A(0)*M(15);
        R(14) := R(10) + A(3)*M(11) + A(2)*M(12) + A(1)*M(13) + A(0)*M(14);
        R(13) := R(09) + A(3)*M(10) + A(2)*M(11) + A(1)*M(12) + A(0)*M(13) + Q(3);
        R(12) := R(08) + A(3)*M(09) + A(2)*M(10) + A(1)*M(11) + A(0)*M(12) + Q(2);
        R(11) := R(07) + A(3)*M(08) + A(2)*M(09) + A(1)*M(10) + A(0)*M(11) + Q(1);
        R(10) := R(06) + A(3)*M(07) + A(2)*M(08) + A(1)*M(09) + A(0)*M(10) + Q(0);
        R(09) := R(05) + A(3)*M(06) + A(2)*M(07) + A(1)*M(08) + A(0)*M(09);
        R(08) := R(04) + A(3)*M(05) + A(2)*M(06) + A(1)*M(07) + A(0)*M(08);
        R(07) := R(03) + A(3)*M(04) + A(2)*M(05) + A(1)*M(06) + A(0)*M(07);
        R(06) := R(02) + A(3)*M(03) + A(2)*M(04) + A(1)*M(05) + A(0)*M(06);
        R(05) := R(01) + A(3)*M(02) + A(2)*M(03) + A(1)*M(04) + A(0)*M(05);
        R(04) := R(00) + A(3)*M(01) + A(2)*M(02) + A(1)*M(03) + A(0)*M(04);
        R(03) :=          A(3)*M(00) + A(2)*M(01) + A(1)*M(02) + A(0)*M(03) + Q(3);
        R(02) :=                       A(2)*M(00) + A(1)*M(01) + A(0)*M(02) + Q(2);
        R(01) :=                                    A(1)*M(00) + A(0)*M(01) + Q(1);
        R(00) :=                                                 A(0)*M(00) + Q(0);

result := R;
    END LOOP;
END LOOP;

result(0) := R(40 TO 47);
result(1) := R(32 TO 39);
result(2) := R(24 TO 31);
result(3) := R(16 TO 23);
result(4) := R(08 TO 15);
result(5) := R(00 TO 07);

RETURN result;

END HashFunction;

FUNCTION ReadHashBucket (index: IN Integer RANGE 0 To 65535)
         RETURN HashBucketType IS VARIABLE hashTableWord: HashTableEntry;
VARIABLE hashBucket:    HashBucketType;

BEGIN

IF index >= 16#B000# THEN
    hashTableWord := hashTable( index - 16#B000# );
    hashBucket    := hashTableWord.hashBuckets(2);   -- Bits 53 DOWNTO 36.

ELSIF index >= 16#5800# THEN
    hashTableWord := hashTable( index - 16#5800# );
    hashBucket    := hashTableWord.hashBuckets(1);   -- Bits 35 DOWNTO 18.

ELSE
    hashTableWord := hashTable( index );
    hashBucket    := hashTableWord.hashBuckets(0);   -- Bits 17 DOWNTO 0.
END IF;

IF BadPktMemParity(hashTableWord, ODD) THEN
    FatalError(PM_PARITY_ERROR);
ELSE
    RETURN hashBucket;
END IF;

END ReadHashBucket;

PROCEDURE BinarySearch (startingIndex: IN  LookupTableIndex;
                        treeSize:      IN  Integer RANGE 0 TO 7;
                        hashedAddress: IN  Bit_Vector(47 DOWNTO 0);
                        finalIndex:    OUT LookupTableIndex;
                        entryFound:    OUT Boolean) IS
```

```
VARIABLE relativeIndex: Integer RANGE 0 TO 7;
VARIABLE index:         LookupTableIndex;
VARIABLE hashRemainder: HashRemainderType;
BEGIN -- Note that relativeIndex takes on values from 0 to (2**L)-1 and represents
-- the current index within that level relative to the start of that level.
relativeIndex := 0;
index         := startingIndex;

FOR L IN 0 TO 2 LOOP
    IF index >= startingIndex + treeSize THEN
        EXIT;
    END IF;

hashRemainder := lookupTable(index).hashRemainder;

IF CvtToInteger( hashedAddress(47 DOWNTO 16) ) = hashRemainder THEN
        finalIndex := index;  -- return pointer to entry we are looking for.
        entryFound := TRUE;
        RETURN;

ELSE -- Advance to the next entry in the table

-- The no. of entries in level L is 2**L, and to get to the beginning of
        -- the next level from the current position, "2**L - relativeIndex" must
        -- be added to the current position. Within the next level, the left
        -- branch of the current position has a relativeIndex twice that of the
        -- current position. Hence the next entry to try (the left or right
        -- branch underneath the current position) will be either
        -- "(2**L - relativeIndex) + 2*relativeIndex" entries later or one
        -- more entry than that (depending one whether the left branch or the
        -- right branch is desired).

index         := index + (2**L) + relativeIndex;
        relativeIndex := 2*relativeIndex;
        IF CvtToInteger( hashedAddress(47 DOWNTO 16) ) > hashRemainder THEN
            index         := index + 1;
            relativeIndex := relativeIndex + 1;
        END IF;

END IF;
END LOOP;

-- Reaching here means that the DA was not found in the binary tree.
finalIndex := 0;
entryFound := FALSE;

END BinarySearch;

PROCEDURE HashLookup (address:    IN  AddressType;
                     result:     OUT LookupTableIndex;
                     entryFound: OUT Boolean) IS VARIABLE hashedAddress: Bit_Vector(47 DOWNTO 0);

BEGIN hashedAddress := HashFunction(address);

bucket := ReadHashBucket( CvtToInteger(hashedAddress(15 DOWNTO 0)) );

IF bucket.bucketSize = 0 THEN
    RETURN 0;  -- No match found.

ELSE -- lookupTablePtr must point to a "breadth first", balanced binary
     -- tree with between 1 and 7 entries (where bucketSize gives the size).
    BinarySearch( (bucket.lookupTablePtr MOD lookupTableSize),
                  bucket.bucketSize, hashedAddress,
                  result, entryFound );
    RETURN result;
END IF;

END HashLookup;
```

```
FUNCTION AddressLookup (addrToBeLookedup: IN  AddressType)
                       RETURNS GigaAddressType IS
VARIABLE camData:        Bit_Vector(12 DOWNTO 0);
VARIABLE lookupTablePtr: LookupTableIndex;
VARIABLE entryFound:     Boolean;
VARIABLE lookupRecord:   LookupRecordType;
BEGIN camData := CamLookup (addrToBeLookedup);
IF camData /= NO_CAM_MATCH THEN
    -- Address must be in the CAM, so get the associated lookupTable info.
    lookupTablePtr  := CvtToInteger( camData(7 DOWNTO 0) );
    lookupRecord := lookupTable(lookupTablePtr);
    RETURN  lookupRecord.gigaAddress;

ELSIF hashingEnabled THEN
    HashLookup(addrToBeLookedup,
               lookupTablePtr, entryFound);

IF entryFound THEN
        lookupRecord := lookupTable(lookupTablePtr);
        RETURN  lookupRecord.gigaAddress;
    END IF;
END IF;

RETURN  (UNKNOWN_ADDRESS, X"00");   -- Use special SwitchNumber for unknown addr.

END AddressLookup;

END FGC_LOOKUP;
```

What is claimed is:

1. A method of performing an address lookup for an N-bit input address in a data communication system, comprising the steps of hashing said N-bit input address by a known hash function to produce an N-bit input hashed address;

indexing into a hash table to select a hash bucket using an index part of said hashed address, the hash bucket containing a pointer and a size value;

indexing into a translation table to select a binary tree of records at a location identified by said pointer, the selected binary tree having a size specified by said size value; and searching said records of said selected binary tree to obtain a stored hashed address from each one of said records, including comparing said stored hashed address from each one of said records with a remainder part of said input hashed address, and when a one of said records with a matching remainder part is found, retrieving a stored address from said one of said records with a matching remainder part.

2. A method according to claim 1 including the step of, in parallel with said hashing, comparing said input address with a stored address in a content addressable memory.

3. A method according to claim 1 including the step of:

hashing a set of N-bit addresses to generate said hash table.

4. A method according to claim 3 including the step of:

storing said set of N-bit addresses to generate said translation table.

5. A method according to claim 1 wherein said hash table includes a number of entries, one entry at each index, and each entry contains a number of said hash buckets.

6. A method according to claim 5 wherein each of said pointers in said hash buckets identifies a binary tree of records in said translation table which can contain a number of said records as determined by said size value, and said size value is from zero to seven.

7. A method according to claim 6 including the step of:

hashing a set of N-bit addresses to generate said hash table, and, if more than seven of said set of N-bit addresses hash to a given one of said hash buckets, storing one of said set of N-bit addresses as an overflow address in a content addressable memory.

8. A method according to claim 7 including the step of, in parallel with said hashing said set of N-bit addresses to generate said hash table, comparing said N-bit input address with said overflow address in said content addressable memory.

9. A method according to claim 8 including the step of indexing into said translation table with a value of said overflow address if a match is found in said comparing, rather than by said pointer.

10. A method according to claim 1 including the step of storing said hash table and said translation table in a memory separate from a processor device performing said steps of hashing and comparing.

11. A method according to claim 1 including the step of sending a packet containing said input address to a location on a network identified by said new address.

12. Apparatus for performing an address lookup for an N-bit input address in a data communication system, comprising:

means for hashing said N-bit input address by a known hash function to produce an N-bit input hashed address;

a hash table, and means for indexing into said hash table to select a hash bucket using an index part of said hashed address, the hash bucket containing a pointer and a size value;

a translation table, and means for indexing into said translation table to select a binary tree of records at a location identified by said pointer, the selected binary tree having a size specified by said size value;

means for searching said records of said selected binary tree to obtain a stored hashed address from each one of said records, including means for comparing said stored hashed address from each one of said records with a remainder part of said input hashed address, and when a one of said records with a matching remainder part is found, retrieving a stored address from said one of said records with a matching remainder part.

13. Apparatus according to claim 12 including comparator means for, in parallel with said hashing, comparing said input address with a stored address in a content addressable memory.

14. Apparatus according to claim 12 including means for hashing a set of N-bit addresses to generate said hash table.

15. Apparatus according to claim 14 including means for storing said set of N-bit addresses to generate said translation table.

16. Apparatus according to claim 12 wherein said hash table includes a number of entries, one entry at each index, and each entry contains a number of said hash buckets.

17. Apparatus according to claim 16 wherein each of said pointers in said hash buckets identifies a binary tree of records in said translation table which can contain a number of said records as determined by said size value, and said size value is from zero to seven.

18. Apparatus according to claim 17 including means for hashing a set of N-bit addresses to generate said hash table, and, if more than seven of said set of N-bit addresses hash to a given one of said hash buckets, storing one of said set of N-bit addresses as an overflow address in a content addressable memory.

19. Apparatus according to claim 18 including means for, in parallel with said hashing said set of addresses to generate said hash table, comparing said input address with any said overflow network address in said content addressable memory.

20. Apparatus according to claim 19 including means for indexing into said translation table with a value of said overflow address if a match is found in said comparing, rather than by said pointer.

21. Apparatus according to claim 12 including means for storing said hash table and said translation table in a memory separate from a processor device performing said steps of hashing and comparing.

22. Apparatus according to claim 12 including means for sending a packet containing said input address to a location on a network identified by said new address.

* * * * *